Oct. 27, 1964     F. J. ADAMS     3,153,947
VEHICULAR STEERING MECHANISM
Filed Feb. 6, 1963     2 Sheets-Sheet 1
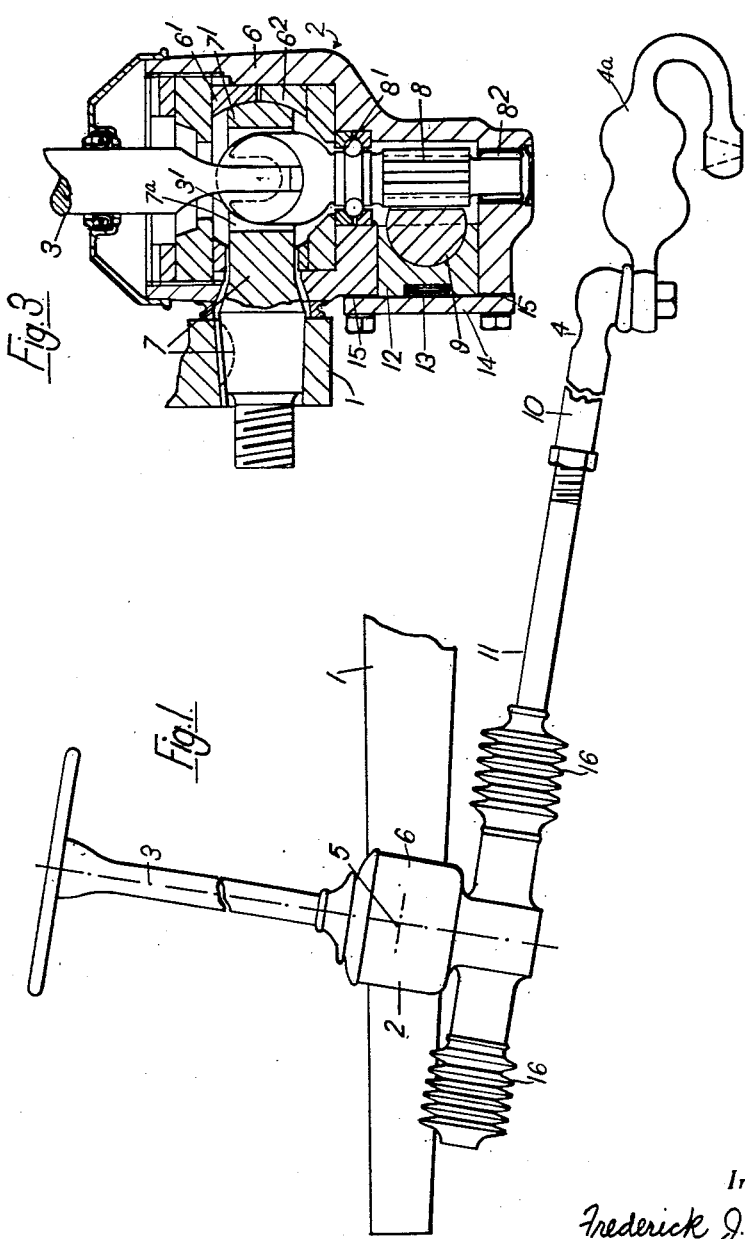
Inventor
Frederick J. Adams
By Baldwin & Wight
Attorneys

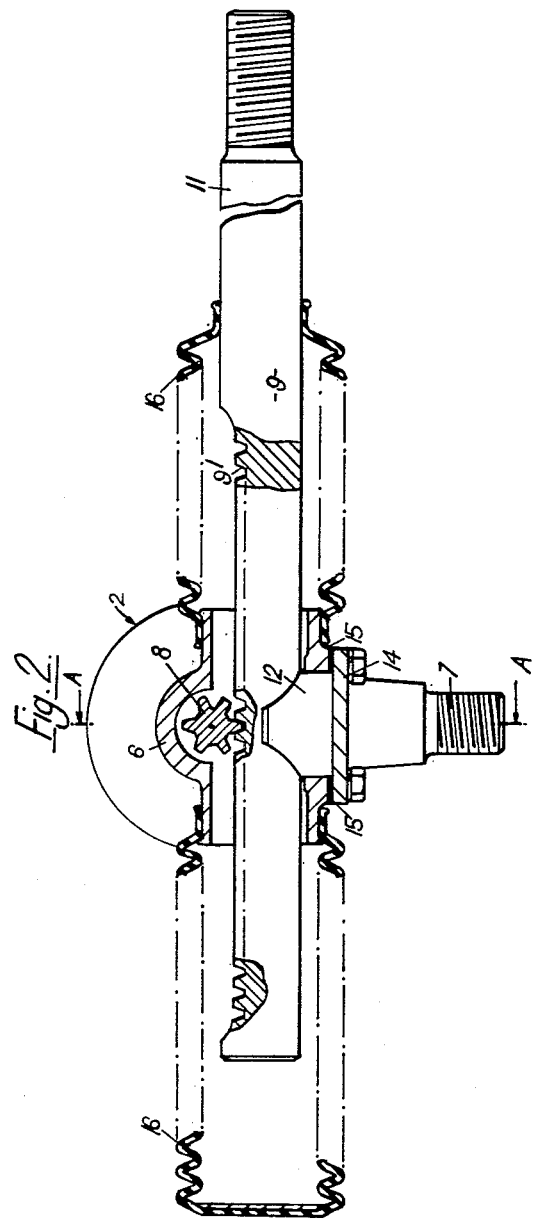

United States Patent Office 3,153,947
Patented Oct. 27, 1964

3,153,947
VEHICULAR STEERING MECHANISM
Frederick J. Adams, Houghton Regis, England, assignor to Hydrosteer Limited
Filed Feb. 6, 1963, Ser. No. 256,568
Claims priority, application Great Britain, Mar. 6, 1962, 8,632/62
10 Claims. (Cl. 74—498)

This invention relates to vehicular steering mechanism comprising a steering gear unit having a driver-controlled input component formed by the usual steering column and an output component which is coupled by a transmission to the steering road wheels of the vehicle.

The main object of the present invention is to enable steering mechanism to accommodate itself to the movement imparted to the wheel axles by irregularities in the road surface.

The invention comprises mounting the steering gear unit itself to pivot about a horizontal axis transverse to the vehicle on a component secured to the frame of the vehicle. In this way the transmission can be simplified as the necessary accommodation to road irregularity is provided by the mounting of the gear unit itself. The pivot is preferably of the universal type and can be formed by the familiar ball and socket type.

So that the manually operated input component shall not have imparted to it the pivoting movement of the unit, that component is coupled to the operating component of the gear via a universal coupling of one sort or another and conveniently by a coupling of the Hooke type. The coupling is advantageously located to have its virtual centre on the axis of pivotal movement of the unit.

The invention is applicable to mechanism of various types and whether incorporating power-assistance or not. The invention is especially applicable to steering mechanism employing the rack and pinion type of steering gear, and one such arrangement is shown in the accompanying drawings of which FIGURE 1 is a general layout of a steering mechanism according to the invention, and FIGURES 2 and 3 are views to a larger scale, FIGURE 2 being a longitudinal horizontal section and FIGURE 3 a local section on the line A—A FIGURE 2.

Referring to the drawings and considering firstly FIGURE 1, a frame member of a vehicle is indicated at 1, the steering gear unit at 2, the driver operated input in the form of a manually operable steering colum member at 3 and the transmission at 4 connected to a steerable road wheel mounting $4^a$. As is indicated in FIGURE 1 the invention is carried into effect by mounting the unit 2 to rock to road shock and to rebound about a transverse horizontal pivot 5 on the frame member 1.

Referring now to FIGURES 2 and 3, which show the unit and its mounting in greater detail, the unit 2 comprises a casing 6 which is mounted to rock about a pivot member or stud 7 which extends laterally from the frame member 1 and which provides the pivot 5. The pivot 5 is in the form of a ball mounting for which purpose the outer end of the stud 7 is formed with a part-spherical surface $7^1$ and the casing 6 has corresponding socket part $6^1$, $6^2$ clamped in it. The casing 6 provides a journal mounting by bearings $8^1$, $8^2$ for a pinion 8 forming the operating member, i.e. the steering effort input component of the gear, and for steering effort output component in the form of a rack 9 slidable in the casing and extending at one end 11 from the casing to be coupled to a drag link 10 constituting a part of the transmission 4.

The column 3 is coupled to the pinion 8 via a Hooke type of universal coupling indicated generally at $3^1$ and as will be clear from the drawing the virtual centre of that coupling coincides with the axis of the stud 7 about which the unit casing 6 can rock. As shown in FIGURE 3, the pivot member 7 is apertured at $7^a$ so as to have an end part surrounding the universal coupling $3^1$.

In the particular arrangement shown the mounting for the rack bar 9 is provided by a slipper 12 which is urged by a disc type of spring 13 to hold the teeth $9^1$ of the rack in mesh with the teeth of the pinion 8, the slipper being held in position in an opening in the casing 6 by a plate 14 between which and the casing shims 15 can be disposed to effect adjustment of the nominal setting of the rack bar.

Also in the constructions shown the rack bar 9 is connected at only one end to a transmission. It could however be coupled at both ends if required. In any case the casing would be packed with grease and the usual concertina bags 16 would be provided as indicated.

It will be clear that the arrangement shown fulfils the object of the invention. The gear and its casing 6 form a unit which is supported to accommodate itself by movement on the ball and socket mounting $7^1$, $6^1$, $6^2$ to movement arising from movement of the road wheels transmitted via the transmission coupling 10, and the column 3 is saved from partaking of that movement by the Hooke coupling $3^1$.

Obviously the invention is not limited to the rack and pinion type of gear shown in the drawings.

I claim:

1. A steering mechanism for a vehicle having a fixed frame part and a steerable road wheel mounting, said mechanism comprising a pivot member secured to the vehicle fixed frame part; a steering gear unit having a steering effort input component and a steering effort output component; means mounting said steering gear unit on said pivot member to pivot freely with respect thereto; and means connecting said output component to said steerable road wheel mounting, said steering gear unit being freely rockable about said pviot member in response to movements imparted to said steerable road wheel mounting by irregularities in the road surface.

2. A steering mechanism according to claim 1 in which said means mounting said steering gear unit on said pivot member comprises a universal joint.

3. A steering mechanism according to claim 2 in which said universal joint is of the ball and socket type.

4. A steering mechanism according to claim 1 including a manually operable steering member; and a universal coupling connecting said steering member to said input component, the virtual centre of said universal coupling being coincident with the axis of said pivot member.

5. A steering mechanism according to claim 4 in which said steering gear unit comprises a casing having socket parts engaged by said pivot member, and in which said pivot member has a part surrounding said universal coupling.

6. A steering mechanism according to claim 5 in which said universal coupling is of the Hooke joint type.

7. A steering mechanism according to claim 1 in which said steering gear unit comprises a casing, and in which said input component is a pinion mounted in said casing and said output component is a rack mounted in said casing and engaging said pinion, and further including a manually operable steering member; and a universal coupling connecting said steering member to said pinion.

8. A steering mechanism according to claim 7 in which said casing has socket parts engaged by said pivot member, and in which said pivot member has a part surrounding said universal coupling, said pviot member and said universal coupling being coincident.

9. A steering mechanism according to claim 8 in which said steering gear unit is rockable on said pivot member about an axis extending longitudinally of the vehicle.

10. A steering mechanism according to claim 1 in which said steering gear unit is rockable on said pivot member about an axis extending longitudinally of the vehicle.

References Cited in the file of this patent

UNITED STATES PATENTS

| 738,997 | Haynes et al. | Sept. 15, 1903 |

FOREIGN PATENTS

| 765,883 | Great Britain | Jan. 16, 1957 |
| 833,086 | Great Britain | Apr. 21, 1960 |